United States Patent
Gepfrey et al.

(10) Patent No.: US 11,498,383 B2
(45) Date of Patent: Nov. 15, 2022

(54) CONTINUOUSLY VARIABLE RATE FLUID SPRING SYSTEM FOR A VEHICLE, AND METHOD OF OPERATION

(71) Applicant: GM GLOBAL TECHNOLOGY OPERATIONS LLC, Detroit, MI (US)

(72) Inventors: Larry G. Gepfrey, Fenton, MI (US); Andrei Balaceanu, Whitby (CA); Walter B. Cwycyshyn, Pleasant Ridge, MI (US); Robert G. Izak, Dryden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 64 days.

(21) Appl. No.: 16/790,105

(22) Filed: Feb. 13, 2020

(65) Prior Publication Data

US 2021/0252934 A1 Aug. 19, 2021

(51) Int. Cl.
  *B60G 17/052* (2006.01)
  *B60G 11/27* (2006.01)
  *B60G 11/28* (2006.01)
  *B60G 17/015* (2006.01)

(52) U.S. Cl.
  CPC ............ *B60G 17/052* (2013.01); *B60G 11/27* (2013.01); *B60G 11/28* (2013.01); *B60G 17/0155* (2013.01); *B60G 2401/00* (2013.01)

(58) Field of Classification Search
  None
  See application file for complete search history.

(56) References Cited

U.S. PATENT DOCUMENTS

| | | | | |
|---|---|---|---|---|
| 2,978,254 A * | 4/1961 | Bundorf | ................ | B60G 21/10 |
| | | | | 280/104 |
| 4,468,739 A * | 8/1984 | Woods | ............... | B60G 17/0155 |
| | | | | 188/319.1 |
| 5,255,935 A * | 10/1993 | Imani | .................... | B60G 11/30 |
| | | | | 267/64.15 |
| 2021/0048084 A1 * | 2/2021 | Murakami | ................ | F16F 9/56 |

FOREIGN PATENT DOCUMENTS

| | | | | |
|---|---|---|---|---|
| CN | 112498043 A | * | 3/2021 | ............. B60G 15/12 |
| DE | 10115978 A1 | * | 10/2002 | ............. B60G 15/12 |
| DE | 102016224081 A1 | | 6/2017 | |

OTHER PUBLICATIONS

German Office Action Issued in German Application No. 10 2021 100 700.3 dated Jan. 31, 2022; 4 Pages.

* cited by examiner

Primary Examiner — Faye M Fleming
(74) Attorney, Agent, or Firm — Cantor Colburn LLP

(57) ABSTRACT

A vehicle fluid spring system is adapted to absorb road shock imparted onto at least one road wheel of a vehicle. The vehicle fluid spring system includes a fluid spring and a variable volume unit. The fluid spring includes a fluid chamber adapted to change in volume. The variable volume unit including a rigid piston cylinder, a piston, a fluid cavity, and an actuator. The piston is adapted to reciprocate within, and is in sliding contact with, the rigid piston cylinder. The fluid cavity is defined by the piston cylinder and the piston. The actuator is adapted to drive the piston changing a volume of the fluid cavity. The fluid cavity is in fluid communication with the fluid chamber.

18 Claims, 6 Drawing Sheets

CONTINUOUSLY VARIABLE RATE FLUID SPRING SYSTEM FOR A VEHICLE, AND METHOD OF OPERATION

The subject disclosure relates to vehicle fluid springs, and more particularly to a continuously variable rate fluid spring system.

Air springs in vehicles are typically part of a leveling control feature used to maintain more desirable trim heights based on driving conditions, independent of vehicle payload. Air springs may maintain, raise, or lower the vehicle's trim height by adjusting the air mass in the air spring. Air mass is added or removed to, or from, the air spring using, for example, a four corner leveling control logic with the aid of a compressor, reservoir air tank, and/or an exhaust valve. Known leveling systems provide the opportunity to improve ride quality by lowering the spring rate and ride frequency when the vehicle is unloaded. Four corner leveling systems also have the ability to dynamically adjust the vehicle trim heights such as lowering the trim height at higher vehicle speeds for fuel economy, and raising trim heights when ground clearance is desired to improve the entry/egress performance for occupants, and to provide more appealing styling cues when parked (i.e., showroom).

Although a four corner air spring system may have the ability to enhance overall vehicle performance, it has some short comings that can degrade performance attributes. For example, vehicle roll stiffness and the resulting roll angle increases from the beginning to the end of a sustained cornering maneuver due to heat transfer effects inside the air spring. Also, because one of the variables that determine a spring rate of the air spring is air volume, spring rate has a trim height dependency (i.e., higher spring rates at lower trim height and lower spring rates at higher trim heights). Furthermore, the force deflection curve of an air spring is not linear. That is, the spring rate increases in jounce and decreases in rebound. The dropping spring rate in rebound, in conjunction with a lower ride frequency at 2PASS, lowers the suspension energy required to contact the rebound stops, degrading the ride and handling performance of the vehicle. Common solutions include increasing the suspension travel in rebound and/or rebound springs are included inside the shock absorber.

Accordingly, it is desirable to provide greater control of spring rates of air spring systems.

SUMMARY

In one exemplary embodiment, a vehicle fluid spring system is adapted to absorb road shock imparted onto at least one road wheel of a vehicle. The vehicle fluid spring system includes a first fluid spring and a first variable volume unit. The first fluid spring includes a fluid chamber adapted to change in volume. The first variable volume unit includes a rigid piston cylinder, a piston adapted to reciprocate within and in sliding contact with the rigid piston cylinder, a fluid cavity defined by the piston cylinder and the piston, and an actuator adapted to drive the piston changing a volume of the fluid cavity. The fluid cavity is in fluid communication with the fluid chamber.

In addition to the foregoing embodiment, the fluid chamber is an air chamber, and the fluid cavity is an air cavity.

In the alternative or additionally thereto, in the foregoing embodiment, the vehicle fluid spring system includes a resilient biasing member adapted to exert a biasing force between the piston and the rigid piston cylinder assisting the actuator when driving the piston into the rigid piston cylinder decreasing the volume of the fluid cavity.

In the alternative or additionally thereto, in the foregoing embodiment, the vehicle fluid spring system includes a controller configured to control actuation of the actuator.

In the alternative or additionally thereto, in the foregoing embodiment, the vehicle fluid spring system includes a second fluid spring including a fluid chamber, and a second variable volume unit. The second variable volume unit includes a rigid piston cylinder, a piston adapted to reciprocate within, and in sliding contact with, the rigid piston cylinder, a fluid cavity defined by the piston cylinder and the piston, and an actuator adapted to drive the piston changing a volume of the fluid cavity. The fluid cavity of the second variable volume unit is in fluid communication with the fluid chamber of the second fluid spring. The controller independently controls the actuators of the first and second variable volume units for vehicle performance.

In the alternative or additionally thereto, in the foregoing embodiment, the vehicle fluid spring system includes a position sensor configure to measure position of the piston.

In the alternative or additionally thereto, in the foregoing embodiment, the vehicle fluid spring system includes a sensor configured to send a signal to the controller indicative of piston position, and a map stored in an electronic storage medium of the controller. The controller is configured to apply the signal to the map and thereby output a command signal indicative of a spring rate.

In the alternative or additionally thereto, in the foregoing embodiment, the command signal is received by the actuator for position of the piston to effect the spring rate.

In the alternative or additionally thereto, in the foregoing embodiment, the actuators each include an electric motor.

A vehicle according to another, non-limiting, embodiment includes a body, four road wheels, four fluid springs, four variable volume units, and a controller. The first fluid spring is coupled between, and adapted to control displacement between, the body and the first road wheel. The first fluid spring includes a first fluid chamber adapted to change in volume. The first variable volume unit includes a piston cylinder, a piston adapted to reciprocate within and in sliding contact with the piston cylinder, a first fluid cavity defined by the piston cylinder and the piston, and a first actuator adapted to drive the piston changing a volume of the first fluid cavity. The first fluid cavity is in fluid communication with the first fluid chamber. The second fluid spring is coupled between, and adapted to control displacement between, the body and the second road wheel. The second fluid spring includes a second fluid chamber adapted to change in volume. The second variable volume unit includes a piston cylinder, a piston adapted to reciprocate within and in sliding contact with the piston cylinder, a second fluid cavity defined by the piston cylinder and the piston, and a second actuator adapted to drive the piston changing a volume of the second fluid cavity. The second fluid cavity is in fluid communication with the second fluid chamber. The third fluid spring is coupled between, and adapted to control displacement between, the body and the third road wheel. The third fluid spring includes a third fluid chamber adapted to change in volume. The third variable volume unit includes a piston cylinder, a piston adapted to reciprocate within and in sliding contact with the piston cylinder, a third fluid cavity defined by the piston cylinder and the piston, and a third actuator adapted to drive the piston changing a volume of the third fluid cavity. The third fluid cavity is in fluid communication with the third fluid chamber. The fourth fluid spring is coupled between, and adapted to control displacement between, the body and the fourth road wheel. The fourth fluid spring includes a fourth fluid chamber adapted to change in volume. The fourth variable volume unit includes a piston cylinder, a piston adapted to reciprocate within and in sliding contact with the piston cylinder, a fourth fluid cavity defined by the piston cylinder and the piston, and a fourth actuator adapted to drive the piston changing a volume of the fourth fluid cavity. The fourth fluid cavity is in fluid communication with the fourth fluid chamber. The controller is configured to independently control actuation of the first, second, third, and fourth actuators.

Additionally to the foregoing embodiment, each one of the first, second, third, and fourth variable volume units include a position sensor configured to detect a position of the respective pistons and send respective position signals to the controller.

In the alternative or additionally thereto, in the foregoing embodiment, the vehicle includes a driving mode selector and a preprogrammed map. The driving mode selector is configured to facilitate selection between a plurality of performance modes, and communicate a selected mode of the plurality of performance modes to the controller. The preprogrammed map is stored in a storage medium of the controller. Computer instructions are executed by a processor of the controller that compares the position signals to the preprogrammed map, and thereby controls the actuators to adjust a trim height of the body based on the selected mode.

In the alternative or additionally thereto, in the foregoing embodiment, the vehicle includes a preprogrammed map stored in an electronic storage medium of the controller. The controller includes a processor configured to execute instructions that utilize the preprogrammed map and the position signals to control spring rates of the respective first, second, third, and fourth fluid springs.

In the alternative or additionally thereto, in the foregoing embodiment, the processor is configured to output command signals to the actuators of the respective first, second, third and fourth variable volume units to control the spring rates of the respective first, second, third, and fourth fluid springs.

In the alternative or additionally thereto, in the foregoing embodiment, the actuators are electric motors.

In the alternative or additionally thereto, in the foregoing embodiment, the piston cylinders are rigid.

A method of operating a fluid spring system according to another, non-limiting embodiment includes the step of receiving by a controller a piston position signal from an variable volume unit of a fluid spring assembly. The piston position signal is applied to a preprogrammed map stored in the controller thereby generating an actuator command signal. The actuator command signal is sent to an actuator of the variable volume unit. A piston of the variable volume unit is then repositioned based on the command signal to control a spring rate of a fluid spring of the fluid spring assembly.

Additionally to the foregoing embodiment, the method includes changing a volume of a piston cylinder cavity via the piston to effect control of the spring rate.

In the alternative or additionally thereto, in the foregoing embodiment, the cavity is in direct fluid communication with a chamber of the fluid spring.

In the alternative or additionally thereto, in the foregoing embodiment, the method includes receiving a driver induced handling event signal by the controller, and receiving a road event signal by the controller. The controller then blends the road event signal with the driver induced handling event signal to generate the actuator command signal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
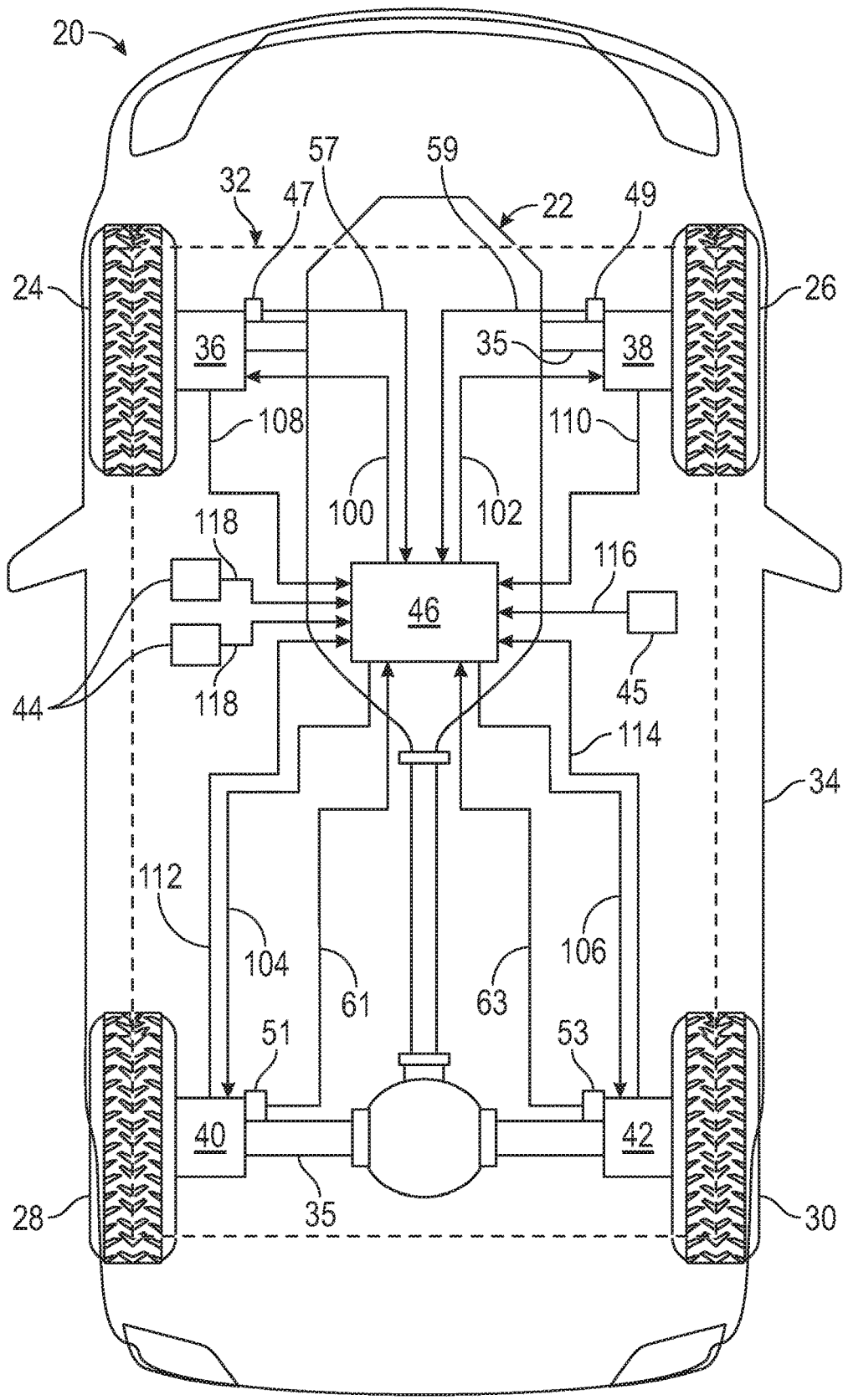
FIG. 1 is a schematic of a vehicle including a fluid spring system as one exemplary, non-limiting, embodiment of the present disclosure.

The following description is merely exemplary in nature and is not intended to limit the present disclosure, its application or uses. It should be understood that throughout the drawings, corresponding reference numerals indicate like or corresponding parts and features. As used herein, the terms module and controller refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment of the present disclosure, FIG. 1 is a schematic of a vehicle 20 that may include a powertrain 22, a plurality of rotating wheels (i.e., two front wheels 24, 26 and two rear wheels 28, 30 illustrated), a fluid spring system 32, a vehicle body 34, and a suspension 35. The fluid spring system 32 is part of the suspension, and is generally coupled between the vehicle body 34 and the wheels 24, 26, 28, 30. The powertrain 22 may include an engine, a transmission, and a transfer case (not shown). The engine generates a drive torque that may be transferred to the transmission via a rotating crank shaft (not shown). The transmission generally adjusts the drive torque that is delivered to one or all of the wheels 24, 26, 28, 30 via the transfer case and other powertrain components. Various types of engines may be employed in the vehicle 20 including, but not limited to, a combustion engine, an electric motor, and a hybrid-type of engine that may combine both the electric motor and combustion engine. The vehicle 20 may be an automobile, truck, van, sport utility vehicle, or any other self-propelled or towed conveyance suitable for transporting a burden.

The fluid spring system 32 is adapted to absorb road shock imparted upon the wheels 24, 26, 28, 30, to facilitate ride comfort, and to contribute toward vehicle stability during various vehicle maneuvers. With regard to vehicle stability, the fluid spring system 32 may control vehicle heave, roll, and pitch, which in turn can affect the yaw response of the vehicle. Heave is considered to be the movement of the front and rear suspension together. Roll is considered to be vehicle rotation about a longitudinal axis of the body 34 (i.e., x-axis, front-to-rear). A roll scenario is the motion a user would notice under heavy cornering where the body 34 leans toward the outside of the turn. Pitch is considered to be vehicle rotation about a lateral axis (i.e., y-axis, left-to-right). Pitching may be seen during a heavy braking or acceleration scenario where the front end of the vehicle 20 respectively dips or rises relative to the rear. Yaw is considered to be vehicle rotation about a vertical axis (i.e., z-axis), such that a yaw angle is a difference between the direction of vehicle travel and the longitudinal axis. In one yaw scenario, the vehicle may be drifting or skidding as it drives along.

Figure 2:
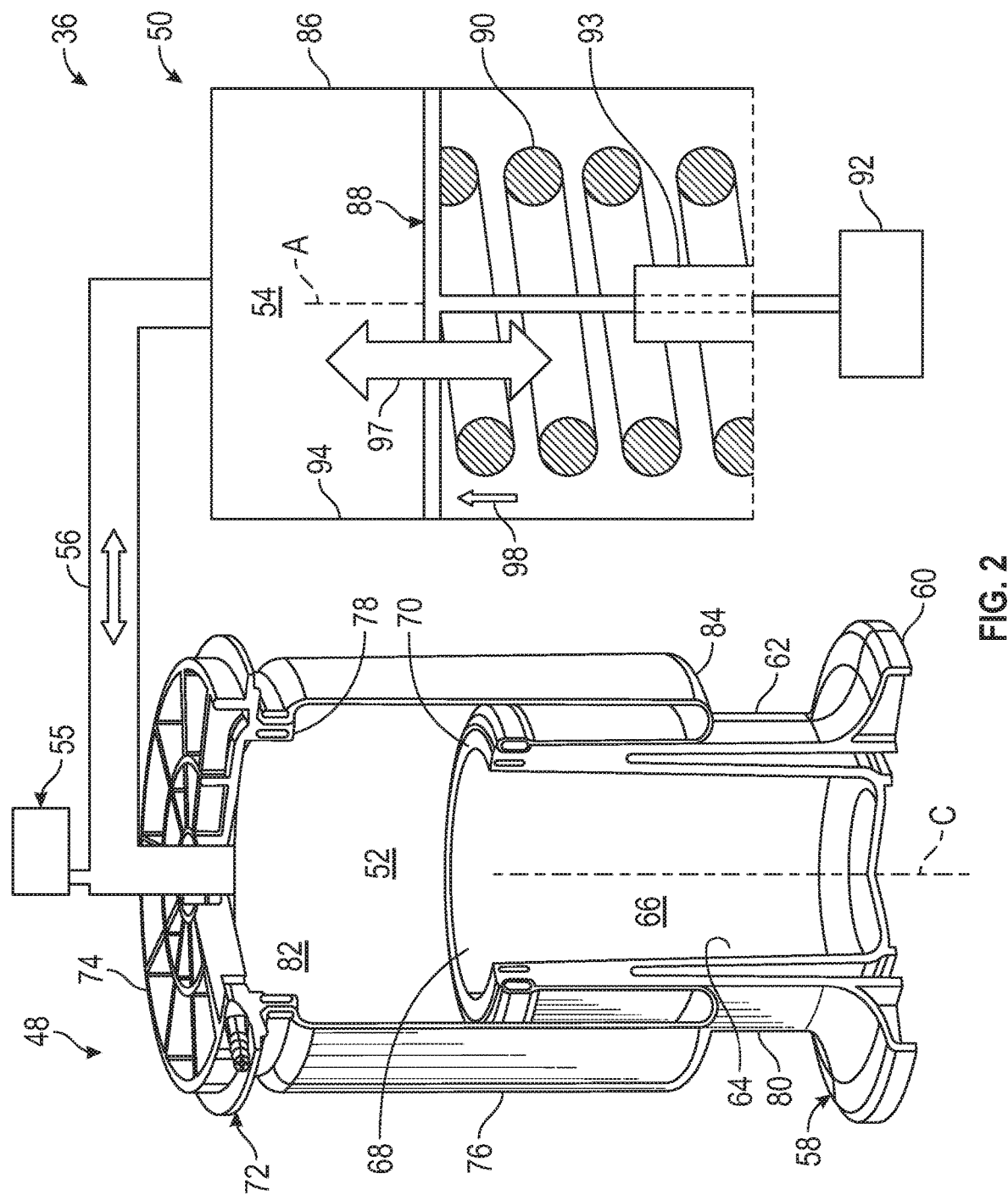
FIG. 2 is a schematic of a fluid spring assembly of the fluid spring system.

Referring to FIGS. 1 and 2, and in an embodiment, the fluid spring system 32 is a continuously variable rate air spring system, and may include a plurality of fluid spring assemblies (i.e., four illustrated as 36, 38, 40, 42 in FIG. 1 with fluid spring assembly 36 illustrated in FIG. 2), a plurality of sensors 44 (i.e., two illustrated in FIG. 1), a driving mode selector 45, a controller 46, a plurality of wheel height sensors (i.e., four illustrated in FIG. 1 as 47, 49, 51, 53), and a compressor and exhaust valve assembly 55. Each of the fluid spring assemblies 36, 38, 40, 42 include a fluid spring 48 (e.g., air spring) and a variable volume unit 50. Each fluid spring 48 may generally be part of the suspension 35, is proximate to the respective wheels 24, 26, 28, 30, and is mounted between the body 34 and the respective wheels 24, 26, 28, 30.

Each fluid spring 48 defines an internal fluid chamber 52. Each variable volume unit 50 may be proximate to the respective fluid spring 48, and defines a fluid cavity 54. The fluid chamber 52 of the fluid spring 48 is in fluid communication with the fluid cavity 54 via, for example, a conduit 56. The fluid chamber 52, the conduit 56, and the fluid cavity 54 are constructed to contain the fluid, and together define the fluid volume of the fluid spring 48. Examples of a fluid include compressible gasses such as air, and inert gasses. In other embodiments, the fluid spring system 32 may include more than, or less than, four fluid spring assemblies, and may be dependent upon the number of wheels used by the vehicle 20.

In an embodiment, the fluid springs 48 each include a lower structure 58 having a base portion 60 indirectly attached to the respective wheels 24, 26, 28, 30, and a circumferentially continuous portion 62 (e.g., cylindrical portion) that is attached to, and projects substantially upward from the base portion 60 along a substantially vertical centerline C. The cylindrical portion 62 includes a circumferentially continuous inner surface 64 centered about the centerline C. The base portion 60 and the inner surface 64 define a blind bore 66, which includes an opening 68 generally defined by a perimeter face 70 carried by the cylindrical portion 62. The perimeter face 70 may be circumferentially continuous and faces substantially upward to, in some embodiments, facilitate a stop.

The fluid spring 48 further includes upper structure 72 having a base member 74 attached to the body 34, and a resiliently flexible bellows 76 centered about the centerline C. The bellows 76 may be sealably attached to a circumferentially continuous rim 78 of the upper structure 72. From the rim 78, the bellows 76 spans downward (as viewed in FIG. 2) and sealably attaches to an outer surface 80 carried by the cylindrical portion 62 and proximate to the perimeter face 70. The fluid chamber 52 includes the blind bore 66 with the remaining portion 82 defined by the base member 74 and the bellows 76. The bellows 76 may include a rolling fold 84 to facilitate vertical displacement between the lower and upper structures 58, 72 as, for example, the fluid spring 48 absorbs shock from the respective wheel 24, 26, 28, 30.

In operation, as the fluid spring 48 absorbs a shock (i.e., the respective wheel 24, 26, 28, 30 moves closer to the body 34), the portion 82 of the chamber 52 reduces in volume. As the respective road wheel 24, 26, 28, 30 moves away from the body 34, the portion 82 of the chamber 52 increases in volume.

Each height sensor 47, 49, 51, 53 is proximate to, and is generally associated with, a respective wheel 24, 26, 28, 30, and may generally be mounted to the suspension 35. Each height sensor 47, 49, 51, 53 is configured to measure a relative position (i.e., vertical height) between the body 34 and the respective wheel 47, 49, 51, 53, and sends respective electrical signals (i.e., see arrows 57, 59, 61, 63) to the controller 46. The controller 46 (e.g., leveling controller) utilizes the height signals 57, 59, 61, 63 for calculations used to maintain a desired trim height of the vehicle.

As is generally known to one having skill in the art, the compressor and exhaust valve assembly 55 (see FIG. 2) is adapted to deliver mass air flow to each fluid spring assembly 36, 38, 40, 42. In an embodiment, the fluid spring system 32 includes only one compressor and exhaust valve assembly 55. In another embodiment, each fluid spring assembly 36, 38, 40, 42 may be associated with a dedicated compressor and exhaust valve assembly 55.

In an embodiment, the variable volume unit 50 of each one of the fluid spring assemblies 36, 38, 40, 42 includes a piston cylinder 86, a piston 88, a biasing member 90 (e.g., coiled spring), an actuator 92 (e.g., electric motor), and a piston position sensor 93. The piston cylinder 86 is centered to and extends along an axis A, may be rigid and non-flexible, and includes an inner surface 94 that faces radially inward and defines, in-part, the cavity 54. The piston 88 is in sealing contact with the inner surface 94 as the piston reciprocates along axis A (see arrow 97 in FIG. 2). The cavity 54 is defined by the inner surface 94 and the piston 88. The biasing member 90 is constructed to exert a biasing force (see arrow 98 in FIG. 2) that biases the piston 88 into, or toward, the cavity 54 to assist the actuator 92 when reducing the volume of the cavity. The piston position sensor 93 is configured to measure the position, or displacement, of the piston 88.

Figure 3:
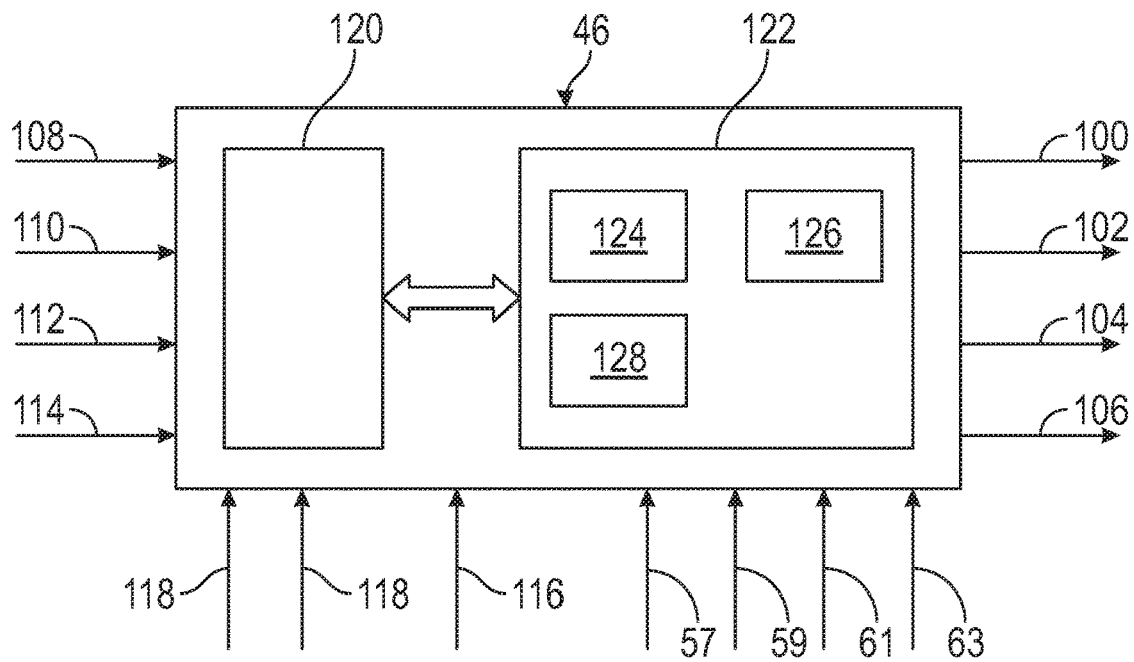
FIG. 3 is a schematic of a controller of the fluid spring system.

Referring to FIGS. 1-3, the controller 46 is configured to send electrical command signals (see arrows 100, 102, 104, 106) to the actuators 92 of the respective fluid spring assemblies 36, 38, 40, 42, to receive electrical height signals 57, 59, 61, 63 from the wheel height sensors 47, 49, 51, 53, to receive electrical position signals (see arrows 108, 110, 112, 114) from the piston position sensors 93 of the respective fluid spring assemblies 36, 38, 40, 42, to receive a selected mode signal (see arrow 116) from the driving mode selector 45, and to receive any one or more signals (see arrows 118) from the plurality of sensors 44. Through the processing and transformation of the various signals received, the controller 46 generates the command signals 100, 102, 104, 106 to independently control the spring rates of the fluid springs 48 of the respective fluid spring assemblies 36, 38, 40, 42 by controlling the location of the piston 88. In some embodiments, the desired spring rate is dependent upon the dynamics of the vehicle 20 (i.e., heave, pitch, and/or roll), and may be further dependent upon the user selected mode of vehicle operation (e.g., tour, comfort, sport, competition, and others) via the driving mode selector 45 operated by the user. The position signals 100, 102, 104, 106 from the piston position sensor 93 may be used as feedback signals confirming the pistons 88 are in the correct position. In another embodiment, the fluid spring system 32 may not include piston position sensors 93.

The signals 118 from any one, or more, of the sensors 44 can be associated with the 'driver commanded' state of the vehicle. Such a driver commanded state can entail a steering wheel position, a steering wheel velocity of rotation, a brake pedal position, a brake pedal velocity when actuated, driveline torque at the road wheels, lateral vehicle speed, longitudinal vehicle speed, and others. In operation, if the driver is accelerating, or braking, the system 32 may stiffen one or more of the springs 48. Moreover, if the driver is turning, the system 32 may stiffen one or more of the springs 48.

In an embodiment, the controller 46 includes at least one processor 120 and at least one electronic storage medium 122. The processor 120 is any combination of one or more of a central processing unit (CPU), multiprocessor, microcontroller unit (MCU), digital signal processor (DSP), application specific integrated circuit (ASIC), and others capable of executing software instructions or otherwise controllable to behave according to predetermined logic. The storage medium 122 is, optionally, any combination of read and write memory (RAM) and read only memory (ROM). The storage medium 122 may also include persistent storage, which can be any single one, or combination of, solid state memory, magnetic memory, and optical memory storing a computer program (i.e., application) with software instructions. In one example, the storage medium 122 may be non-transitory. The controller 46 may include multiple controllers. For example, the controller 46 may include at least one leveling controller, and at least one continuous fluid spring controller (not specifically shown).

The storage medium 122 is configured to store computer instructions, or software, 124 and at least one wheel height position map (i.e., two illustrated as 126, 128 in FIG. 3) that may be empirically formulated and preprogrammed as data. With incoming data (i.e., signals 108-118), the processor 120 executes the instructions 124 that applies the wheel height position map 126 to transform the signals into one or more of the command signals 100, 102, 104, 106. It is understood and contemplated that the map(s) 126 may be, or may include, empirically established equations or algorithms.

In an embodiment, the wheel height position map 126 may, at least in-part, be a function of fluid temperature, the sensor 44 may be a temperature sensor that measures fluid temperature in real time, and the signal 118 may be a temperature signal. With increasing fluid temperature, the controller 46 may output one or more command signals 100, 102, 104, 106 that cause the respective actuators 92 to increase the volume of the cavity 54 thus preventing an undesired increase in spring rate of the respective fluid spring 48. Therefore, the spring rate is a function of fluid temperature, wheel height, and piston position. Similarly, the wheel height position map 126 may be preprogrammed based on other operating scenarios and time dependency. For example, fluid temperature may be predicted based on various vehicle maneuver scenarios requiring multiple maps with each map based on a particular vehicle maneuver.

When temperature changes of the fluid are accounted for by use of the map 126, the differences in the transient and steady state ride and harshness performance characteristics of the vehicle 20 can be reduced, or eliminated. That is, the heat transfer properties of the fluid spring 48 affect the spring rate at low frequencies (i.e., less than one Hertz (1 Hz)), causing a significant reduction in roll gradient during a vehicle cornering scenario. The controller 46 may be configured to adjust the motion of the piston 88 of the variable volume unit 50 to eliminate the adiabatic and isothermal effects associated with the fluid springs 48.

In the same, or another embodiment, the controller 46 is configured to tailor a suspension rate curve (see FIG. 4) by making movement of the piston 88 (detected by the position sensor 93) a function of travel position of the fluid spring 48. To facilitate this feature, one or more of the sensors 44 may be a vehicle height sensor that general measures, or detects the height of the body 34 from the wheels 24, 26, 28, 30. The height of the body 34 from the wheels 24, 26, 28, 30 can be used as an indicator of the distance between hard stops of the fluid spring 48 (i.e. distance between face 70 and rim 78). The curve may then depict a constant spring rate through much of the travel of the fluid spring 48, but the spring rate increases (i.e., volume of cavity 54 is decreased) when the fluid spring 48 nears the hard stop.

Figure 4:
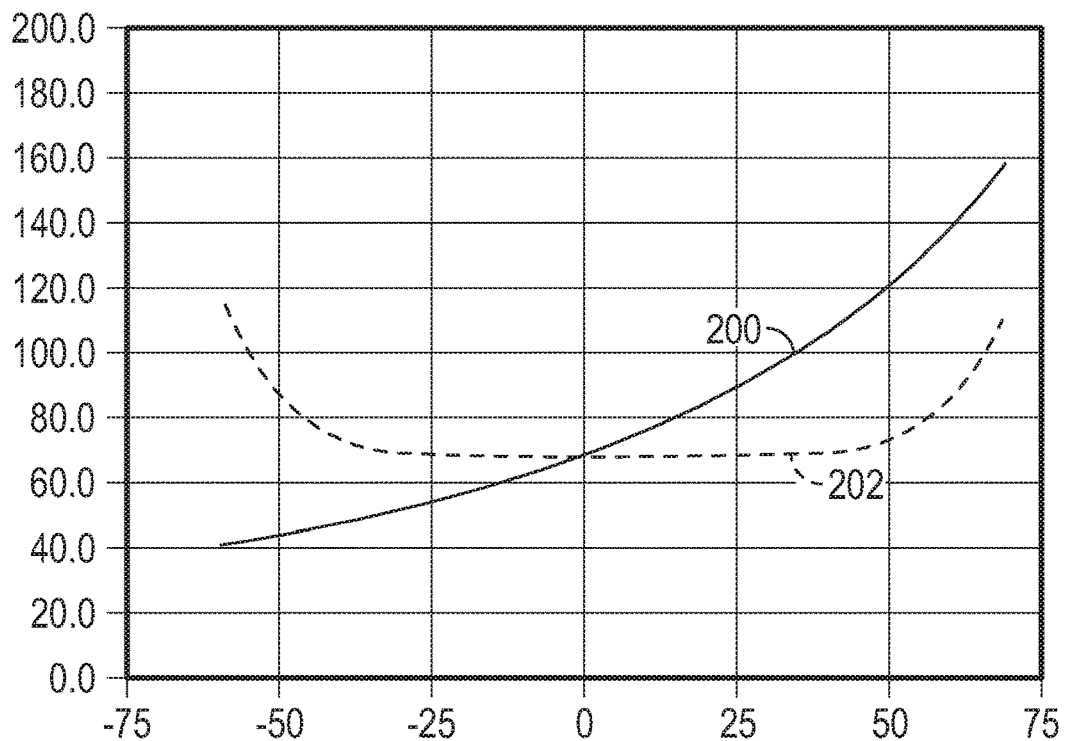
FIG. 4. is a graph of a tailored spring rate curve associated with the fluid spring system.

As best shown in FIG. 4, a tailored spring rate curve graph depicts a dynamic spring rate in Newtons per millimeter as the vertical axis (i.e., y-axis), and spring displacement in millimeters as the horizontal axis (i.e., x-axis). A first curve 200 is a typical, or traditional, fluid spring rate curve. A second curve 202 is a tailored fluid spring rate curve utilizing the variable volume unit 50 of the present disclosure.

In another operating scenario and in the same or another embodiment, a vehicle trim height (i.e., distance between chassis and road) may be changed without the need for a compressor, by offsetting the position of the piston 88. In this embodiment, the plurality of sensors 44 may include four height sensors proximate to respective road wheels 24, 26, 28, 30, and configured to measure height between, for example, the road and the body 34 of the vehicle 20. Each road height sensor 44 may generate and send a road height signal 118 to the controller 46. The controller 46 may then utilize the position displacement map 128, the road height signal(s) 118, and piston position signals 108, 110, 112, 114, to generate and output command signals 100, 102, 104, 106 that facilitate adjustment of the respective pistons 88 of the variable volume unit 50. Adjustment of the pistons 88 provides the same spring rate curve independent of the trim height. For example, a user or driver of the vehicle 20 may prefer a different trim height for any variety of reasons including off-road, snow, normal ride height, aero, sport, and others; and, via the driving mode selector 45 sends a mode signal 116 to the controller 46. Upon receipt of the mode signal 116, the controller 46 adjusts the trim height while maintain the same spring rate.

Figure 5:
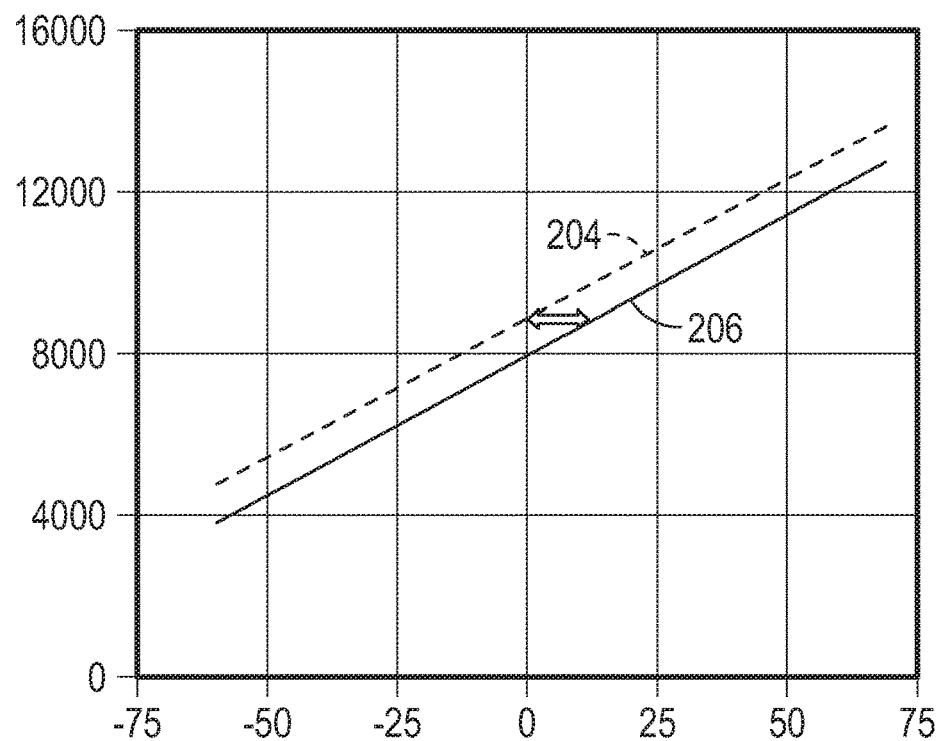
FIG. 5 is a graph of a trim height change associated with the fluid spring system.

Referring to FIG. 5, a trim height change graph depicts a spring force in Newtons as the vertical axis (i.e., y-axis), and spring displacement in millimeters as the horizontal axis (i.e., x-axis). A first curve 204 is a load deflection curve representative of a Normal Ride Height (NRH) mode of operation that may be chosen by the vehicle operator. The second curve 206 is another load deflection curve representative of an aero mode of operation. The aero mode of operation depicts vehicle operation at a lower trim height but with the same spring forces to the NRH mode.

In another operating scenario and in the same or another embodiment, vehicle handling (i.e., front-to-rear roll couple distribution) may be optimized utilizing the fluid spring system 32. For example, the variable volume units 50 can be used to adjust the front and rear spring rates independently to change understeer characteristics of the vehicle 20. More specifically, the spring rates of the fluid spring assemblies 36, 38 proximate to the respective front road wheels 24, 26 can be adjusted independently of the spring rates of the fluid spring assemblies 40, 42 proximate to the respective rear road wheels 28, 30 (see FIG. 1). Increasing the front spring rates and lowering the rear spring rates will increase the Tire Lateral Load Transfer Distribution (TLLTD) resulting in more understeer, thereby increasing the vehicle handling stability. It is understood that TLLTD is a measure of the front-to-rear balance of how lateral load is transferred in a cornering maneuver. The term "front-to-rear roll couple distribution" is the relative roll stiffness between the front and rear of the vehicle 20. In cornering maneuvers, the front of the vehicle 20 may roll less than the rear of the vehicle 20, which has an impact on how the weight of the vehicle 20 is distributed.

In yet another operating scenario and in the same or another embodiment, the fluid spring system 32 may be utilized to maintain equal left and right spring rates along with equal left and right trim heights. This is particularly advantageous where the vehicle is under non-symmetrical, static, loading.

Figure 6:
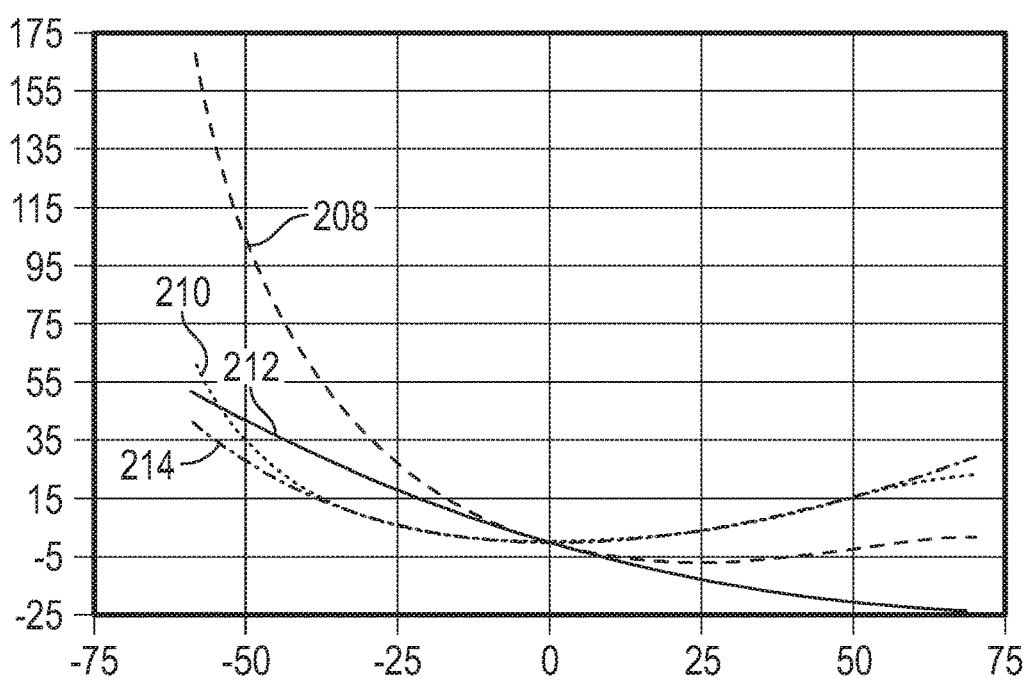
FIG. 6 is graph of an auxiliary piston displacement mapping associated with the fluid spring system.

Referring to FIG. 6, an auxiliary piston displacement mapping graph depicts an auxiliary piston displacement in millimeters as the vertical axis (i.e., y-axis), and spring displacement in millimeters as the horizontal axis (i.e., x-axis). The graph may be utilized during design development to assist in generating the maps (i.e., maps 126, 128 and others) stored in the storage medium, 122 of the controller 46. Curve 208 is a sport mode curve. Curve 210 is a tailored rate curve. Curve 212 is a static rate increased to dynamic rate curve. Curve 214 is a trim change curve.

By mapping motion of the piston 88 of the variable volume unit 50, advantages and benefits of the present disclosure include changing spring rates as a function of spring travel for improved spring rate tailoring. Other advantages include the ability to lower the spring rate at and around trim for improved ride comfort, and increasing spring rates near suspension stops to prevent fluid spring crash through (i.e., bottoming-out) and eliminating the need for a rebound spring. Further benefits include the ability to compensate for heat transfer effects on the spring rate contributing toward improved handling and braking; ability to change vehicle trim heights without the need of a compressor; the ability to change spring rate curves based on driver selectable modes; and the ability to change roll couple distribution during handling maneuvers for improved agility and stability.

Figure 7:
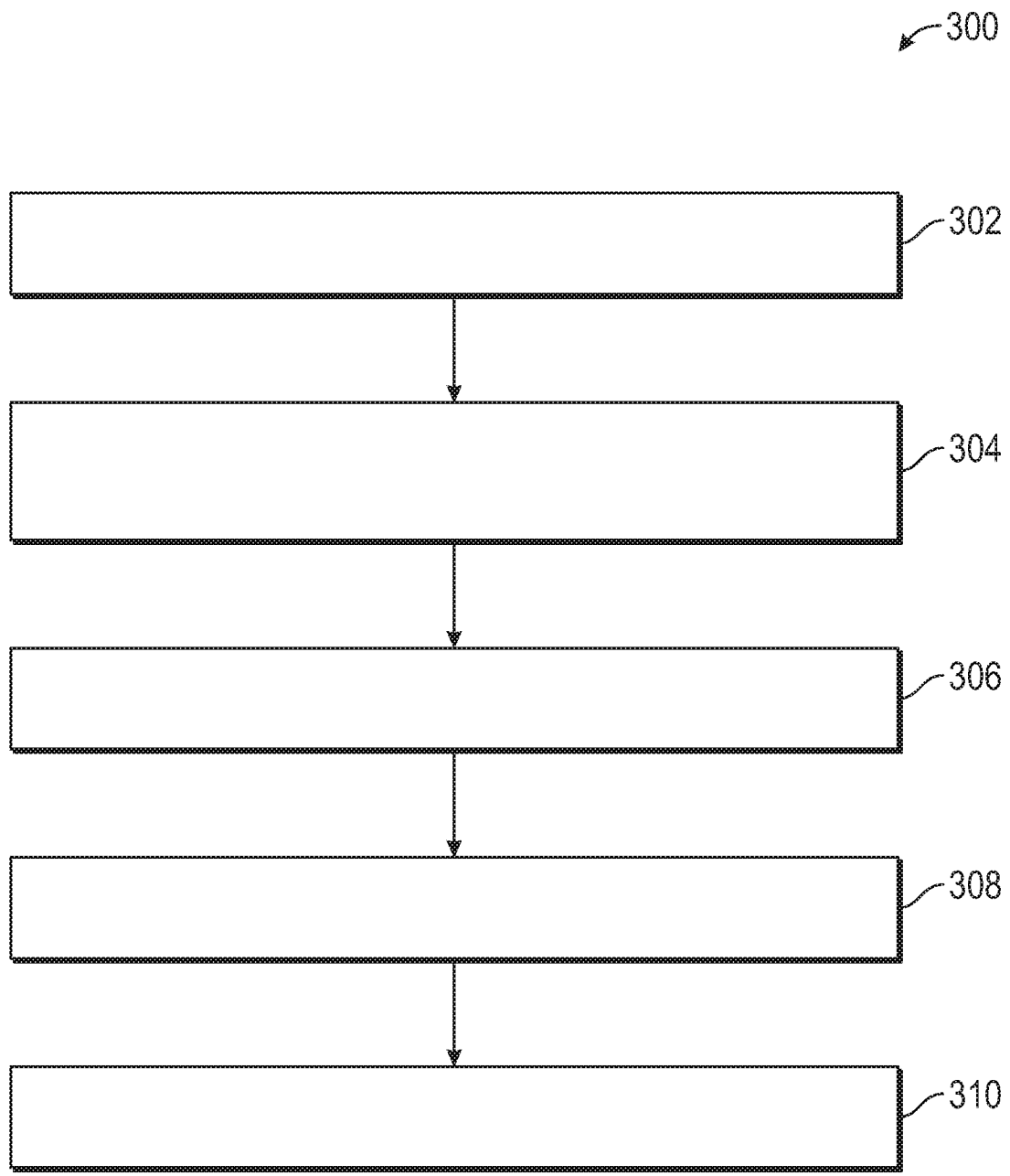
FIG. 7 is a flow chart of a method of operating the fluid spring system.

Referring to FIG. 7, a flow chart illustrating a method 300 of controlling the fluid spring assembly 36 is illustrated. At block 302, at least one piston position signal(s) 108, 110, 112, 114 is received by the controller 46 from at least one respective variable volume unit 50 of respective fluid spring assemblies 36, 38, 40, 42. At block 304, the piston position signal(s) 108, 110, 112, 114 are applied to a preprogrammed map 126 stored in the controller 46 thereby generating respective actuator command signal(s) 100, 102, 104, 106. At block 306, the actuator command signals 100, 102, 104, 106 are sent to respective actuators 92 of the variable volume units 50.

At block 308, a piston of each one of the variable volume units 50 are repositioned based on the respective command signals 100, 102, 104, 106. At block 310, a volume of a piston cylinder cavity of each variable volume unit 50 is changed via the piston repositioning thereby controlling the respective spring rates of the respective fluid springs 48.

Figure 8:
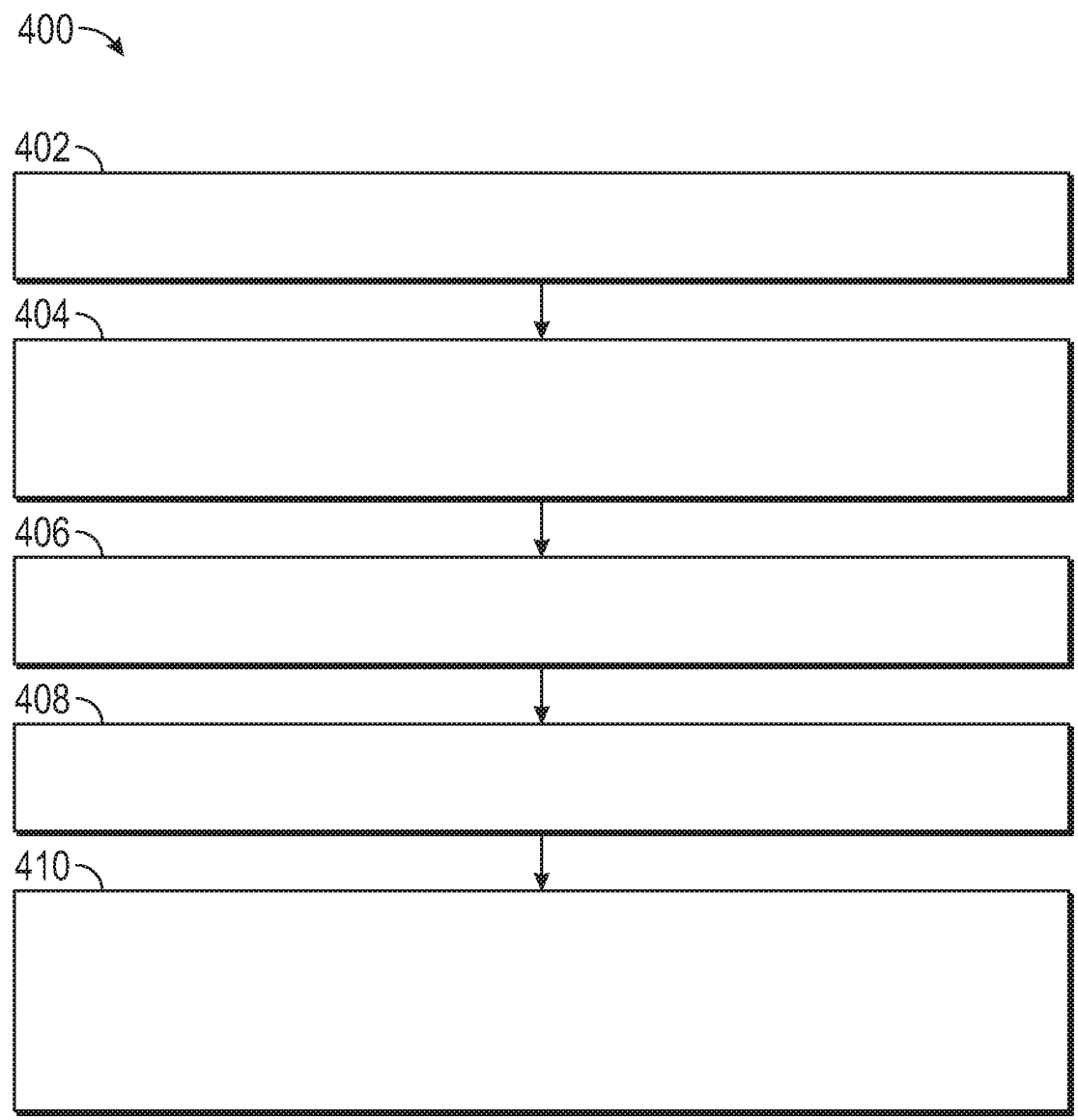
FIG. 8 is a flow chart of another method of operating the fluid spring system.

Referring to FIG. 8, a flow chart illustrating another method 400 of controlling the fluid spring assembly 36 is illustrated. Method 400 may supplement, or may be independent from, the method 300. At block 402, a mode signal 116 is received by a controller 46, and from a mode selector switch 45. At block 404, at least one signal 118 is received by a controller 46, and from a sensor 44. The sensor 44 and the signal(s) 118 are associated with a driver induced 'handling event,' and thus may be at least one of a steering wheel position, a rate of change of steering wheel position, a brake pedal position, a rate of change of brake pedal position, a drive-line torque at the wheels, vehicle speed, lateral acceleration, longitudinal acceleration, and others indicative of a handling event.

At block 406, road event signals 57, 59, 61, 63 (e.g., trim height signals) are received by the controller 46, and from respective trim height sensors 47, 49, 51, 53. As oppose to 'handling events,' the trim height signals 57, 59, 61, 63 are, at least in-part, indicative of 'road events.' An example of such a road event may be a dynamic reaction of a vehicle to bumps in a road, and/or potholes.

At block 408, the controller 46 defines pre-programmed handling characteristics based on the mode signal 116. At block 410, the controller 46 blends the handling event signal(s) 44 with the road event signals 57, 59, 61, 63 based at least in-part on the mode signal 116 to optimize handling of the vehicle by individually controlling the spring rates of the fluid springs 48. It is understood that such 'blending,' and in view of the mode signal 116, may amount to the selection and use of an appropriate preprogrammed map 126, 128 by the controller 46.

It is further contemplated and understood that the controller 46 may be configured to assign preference to handling events (i.e., turning, acceleration, and braking) and road events (i.e., bumps, road slope, etc.) over optimizing the vehicle ride (e.g., comfort). That is, if no handling and/or road events are occurring, then the controller is configured to optimize vehicle ride.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vehicle fluid spring system adapted to absorb road shock imparted onto at least one road wheel of a vehicle, the vehicle fluid spring system comprising:
a first fluid spring including a fluid chamber adapted to change in volume; and
a first variable volume unit including a rigid piston cylinder, a piston adapted to reciprocate within and in sliding contact with the rigid piston cylinder, a fluid cavity defined by the piston cylinder and the piston, and an actuator adapted to drive the piston changing a volume of the fluid cavity, wherein the fluid cavity is in continuous fluid communication with the fluid chamber.

2. The vehicle fluid spring system set forth in claim 1, wherein the fluid chamber is an air chamber, and the fluid cavity is an air cavity.

3. The vehicle fluid spring system set forth in claim 1, further comprising a resilient biasing member adapted to exert a biasing force between the piston and the rigid piston cylinder assisting the actuator when driving the piston into the rigid piston cylinder decreasing the volume of the fluid cavity.

4. The vehicle fluid spring system set forth in claim 1, further comprising a controller configured to control actuation of the actuator.

5. The vehicle fluid spring system set forth in claim 4, further comprising:
- a second fluid spring including a fluid chamber; and
- a second variable volume unit including a rigid piston cylinder, a piston adapted to reciprocate within and in sliding contact with the rigid piston cylinder, a fluid cavity defined by the piston cylinder and the piston, and an actuator adapted to drive the piston changing a volume of the fluid cavity, wherein the fluid cavity of the second variable volume unit is in fluid communication with the fluid chamber of the second fluid spring, and the controller independently controls the actuators of the first and second variable volume units for vehicle performance.

6. The vehicle fluid spring system set forth in claim 1, further comprising a position sensor configured to measure position of the piston.

7. A vehicle fluid spring system adapted to absorb road shock imparted onto at least one road wheel of a vehicle, the vehicle fluid spring system comprising:
- a first fluid spring including a fluid chamber adapted to change in volume;
- a first variable volume unit including a rigid piston cylinder, a piston adapted to reciprocate within and in sliding contact with the rigid piston cylinder, a fluid cavity defined by the piston cylinder and the piston, and an actuator adapted to drive the piston changing a volume of the fluid cavity, wherein the fluid cavity is in fluid communication with the fluid chamber;
- a controller configured to control actuation of the actuator;
- a sensor configured to send a signal to the controller indicative of piston position; and
- a map stored in an electronic storage medium of the controller, wherein the controller is configured to apply the signal to the map and thereby output a command signal indicative of a spring rate.

8. The vehicle fluid spring system set forth in claim 7, wherein the command signal is received by the actuator for position of the piston to affect the spring rate.

9. A vehicle fluid spring system adapted to absorb road shock imparted onto at least one road wheel of a vehicle, the vehicle fluid spring system comprising:
- a first fluid spring including a fluid chamber adapted to change in volume;
- a first variable volume unit including a rigid piston cylinder, a piston adapted to reciprocate within and in sliding contact with the rigid piston cylinder, a fluid cavity defined by the piston cylinder and the piston, and an actuator adapted to drive the piston changing a volume of the fluid cavity, wherein the fluid cavity is in fluid communication with the fluid chamber;
- a controller configured to control actuation of the actuator;
- a second fluid spring including a fluid chamber; and
- a second variable volume unit including a rigid piston cylinder, a piston adapted to reciprocate within and in sliding contact with the rigid piston cylinder, a fluid cavity defined by the piston cylinder and the piston, and an actuator adapted to drive the piston changing a volume of the fluid cavity, wherein the fluid cavity of the second variable volume unit is in fluid communication with the fluid chamber of the second fluid spring, and the controller independently controls the actuators of the first and second variable volume units for vehicle performance, wherein the actuators each include an electric motor.

10. A vehicle comprising:
- a body;
- a first road wheel;
- a first fluid spring coupled between and adapted to control displacement between the body and the first road wheel, the first fluid spring including a first fluid chamber adapted to change in volume;
- a first variable volume unit including a piston cylinder, a piston adapted to reciprocate within and in sliding contact with the piston cylinder, a first fluid cavity defined by the piston cylinder and the piston, and a first actuator adapted to drive the piston changing a volume of the first fluid cavity, wherein the first fluid cavity is in fluid communication with the first fluid chamber;
- a second road wheel;
- a second fluid spring coupled between and adapted to control displacement between the body and the second road wheel, the second fluid spring including a second fluid chamber adapted to change in volume;
- a second variable volume unit including a piston cylinder, a piston adapted to reciprocate within and in sliding contact with the piston cylinder, a second fluid cavity defined by the piston cylinder and the piston, and a second actuator adapted to drive the piston changing a volume of the second fluid cavity, wherein the second fluid cavity is in fluid communication with the second fluid chamber;
- a third road wheel;
- a third fluid spring coupled between and adapted to control displacement between the body and the third road wheel, the third fluid spring including a third fluid chamber adapted to change in volume;
- a third variable volume unit including a piston cylinder, a piston adapted to reciprocate within and in sliding contact with the piston cylinder, a third fluid cavity defined by the piston cylinder and the piston, and a third actuator adapted to drive the piston changing a volume of the third fluid cavity, wherein the third fluid cavity is in fluid communication with the third fluid chamber;
- a fourth road wheel;
- a fourth fluid spring coupled between and adapted to control displacement between the body and the fourth road wheel, the fourth fluid spring including a fourth fluid chamber adapted to change in volume;
- a fourth variable volume unit including a piston cylinder, a piston adapted to reciprocate within and in sliding contact with the piston cylinder, a fourth fluid cavity defined by the piston cylinder and the piston, and a fourth actuator adapted to drive the piston changing a volume of the fourth fluid cavity, wherein the fourth fluid cavity is in fluid communication with the fourth fluid chamber;
- a controller configured to independently control actuation of the first, second, third, and fourth actuators, wherein each one of the first, second, third, and fourth variable volume units include a position sensor configured to detect a position of the respective pistons and send respective position signals to the controller;
- a driving mode selector configured to facilitate selection between a plurality of performance modes, and communicate a selected mode of the plurality of performance modes to the controller; and a preprogrammed map stored in a storage medium of the controller, wherein computer instructions are executed by a processor of the controller that compares the position signals to the preprogrammed map and thereby controls the actuators to adjust a trim height of the body based on the selected mode.

11. The vehicle set forth in claim 10, further comprising a preprogrammed map stored in an electronic storage medium of the controller, wherein the controller includes a processor configured to execute instructions that utilize the preprogrammed map and the position signals to control spring rates of the respective first, second, third, and fourth fluid springs.

12. The vehicle set forth in claim 11, wherein the processor is configured to output command signals to the actuators of the respective first, second, third and fourth variable volume units to control the spring rates of the respective first, second, third, and fourth fluid springs.

13. The vehicle set forth in claim 10, wherein the actuators are electric motors.

14. The vehicle set forth in claim 10, wherein the piston cylinders are rigid.

15. A method of operating a fluid spring system comprising:

receiving by a controller a piston position signal from a variable volume unit of a fluid spring assembly;

applying the piston position signal to a preprogrammed map stored in the controller thereby generating an actuator command signal;

sending the actuator command signal to an actuator of the variable volume unit; and repositioning of a piston of the variable volume unit based on the command signal to control a spring rate of a fluid spring of the fluid spring assembly.

16. The method set forth in claim 15, further comprising changing a volume of a piston cylinder cavity via the piston to effect control of the spring rate.

17. The method set forth in claim 16, wherein the cavity is in direct fluid communication with a chamber of the fluid spring.

18. The method set forth in claim 15, further comprising:

receiving a driver induced handling event signal by the controller;

receiving a road event signal by the controller; and blending the road event signal with the driver induced handling event signal by the controller toward generation of the actuator command signal.

* * * * *